(12) United States Patent
Grawenhof et al.

(10) Patent No.: US 10,520,010 B2
(45) Date of Patent: Dec. 31, 2019

(54) JOINT SHAFT, IN PARTICULAR UNIVERSAL JOINT SHAFT

(71) Applicant: VOITH PATENT GMBH, Heidenheim (DE)

(72) Inventors: Peter Grawenhof, Dettingen (DE); Erich Haluk, Steinheim (DE); Roger Clement, Lavalle (CA)

(73) Assignee: Voith Patent GmbH, Heidenheim (DE)

( * ) Notice: Subject to any disclaimer, the term of this patent is extended or adjusted under 35 U.S.C. 154(b) by 246 days.

(21) Appl. No.: 15/532,600

(22) PCT Filed: Oct. 16, 2015

(86) PCT No.: PCT/EP2015/073970
§ 371 (c)(1),
(2) Date: Jun. 2, 2017

(87) PCT Pub. No.: WO2016/087107
PCT Pub. Date: Jun. 9, 2016

(65) Prior Publication Data
US 2018/0017098 A1     Jan. 18, 2018

(30) Foreign Application Priority Data
Dec. 3, 2014   (DE) .......................... 10 2014 224 813

(51) Int. Cl.
*F16C 3/03*     (2006.01)
*F16D 3/06*     (2006.01)
*F16D 3/40*     (2006.01)

(52) U.S. Cl.
CPC ................. *F16C 3/03* (2013.01); *F16D 3/06* (2013.01); *F16D 3/40* (2013.01); *Y10T 403/32475* (2015.01); *Y10T 403/32491* (2015.01)

(58) Field of Classification Search
CPC ..... F16C 3/03; F16D 3/06; F16D 3/40; Y10T 403/32475; Y10T 403/32491
(Continued)

(56) References Cited

U.S. PATENT DOCUMENTS 2,409,662 A    10/1946  Christensen
2,650,484 A *   9/1953  Bujak ...................... F16D 3/06
                                                                        464/162
(Continued)

FOREIGN PATENT DOCUMENTS

DE           6908115 U       1/1974
DE      202004000838 U1      4/2004
(Continued)

*Primary Examiner* — Greg Binda
(74) *Attorney, Agent, or Firm* — Laurence A. Greenberg; Werner H. Stemer; Ralph E. Locher

(57) ABSTRACT

A joint shaft, in particular a universal joint shaft, has first and second axial connection ends and a central part that connects the two connection ends to one another in a torsionally rigid and pivotable manner. At least one intermediate sleeve is provided between a first and a second shaft element with internal gearing having inner teeth, which are distributed over the circumference and extend in the direction of the longitudinal axis, and external gearing with outer teeth, which are distributed over the circumference and extend in the direction of the longitudinal axis. The sleeve is longitudinally displaceable relative to the first shaft element and to the second shaft element and is attached directly or indirectly in a torsionally rigid manner to the first shaft element by way of the intermediate sleeve external gearing and to the second shaft element by way of the intermediate sleeve internal gearing.

18 Claims, 3 Drawing Sheets

(58) Field of Classification Search
USPC .......................................................... 464/162
See application file for complete search history.

(56) References Cited

U.S. PATENT DOCUMENTS

| | | | |
|---|---|---|---|
| 4,125,000 | A | 11/1978 | Grob |
| 4,932,280 | A | 6/1990 | Becker et al. |
| 5,186,079 | A | 2/1993 | Gee |
| 5,464,251 | A | 11/1995 | Castellon |
| 6,083,108 | A * | 7/2000 | Grubish .................... F16C 3/02 |
| | | | 464/162 |
| 6,241,616 | B1 | 6/2001 | Lightcap |
| 8,157,660 | B2 | 4/2012 | Disser |
| 8,419,555 | B2 | 4/2013 | Tokioka |

FOREIGN PATENT DOCUMENTS

| | | | | |
|---|---|---|---|---|
| FR | 1.330.805 | * | 5/1963 | .................... 464/162 |
| JP | H06255498 A | | 9/1994 | |
| JP | 2013158425 A | | 8/2013 | |
| WO | 2009012746 A2 | | 1/2009 | |

\* cited by examiner

JOINT SHAFT, IN PARTICULAR UNIVERSAL JOINT SHAFT

BACKGROUND OF THE INVENTION

Field of the Invention

The present invention relates to a joint shaft, in particular to a universal joint shaft for applications where the joint shaft is used in a first operating state with a comparably short axial length for transmitting torque or rather drive power, and is used in a second operating state with a comparably longer axial length for transmitting torque or rather drive power. This means that the joint shaft has to be capable of transmitting a predefined torque (nominal torque), in particular an identical torque, both in the state with the shorter axial length and in the state with the longer axial length.

Joint shafts which are designed for the abovementioned use comprise axial length compensation, also designated as a telescopic function. Corresponding to an intended purpose of the present invention, such joint shafts are used, for example, in roll mills for driving work rolls by means of a drive unit. The known joint shafts with length compensation comprise a central part between two axial connection ends, the central part comprising a first tubular shaft element with internal gearing and a second rod-shaped shaft element with external gearing. The internal gearing and the external gearing engage one another in order, on the one hand, to transmit torque from the inner part to the outer part or vice versa. In addition, the gearings which engage one another make it possible for the inner part (the second shaft element) to be extended out of the outer part (the first shaft element) without the gearing engagement being lost.

For the published prior art, reference is made to DE 20 2004 000 838 U1, the already disclosed features of which are included in the claims. For the further published prior art, reference is made to JP 2012-21594 A and U.S. Pat. No. 8,419,555 B2.

SUMMARY OF THE INVENTION

It is a disadvantage in the case of joint shafts with axial length compensation of the type named in the introduction that said joint shafts comprise a considerable axial length which is not suitable for a frequently required small axial installation space in roll mills. The length is necessary due to the fact that with the second shaft element extended out of the first shaft element, a sufficient axial overlap between both shaft elements is also necessary in order to transmit the required torque or rather the required drive power to one another reliably over the axial support region of both the gearings. Too short an axial support region between the gearings would generate inadmissibly high forces or rather surface pressures which could result in premature wear or in destruction of the gearing or rather of the shaft elements carrying the gearing.

The object underlying the invention is to provide a joint shaft, in particular a universal joint shaft, having axial length compensation, which joint shaft, in spite of a possible long axial extension, comprises a short minimum axial length in order also to be able to be used in small axial installation spaces, in particular in the drive train of roll mills.

The object according to the invention is achieved by a joint shaft with the features of the claims. Advantageous and particularly expedient designs of the invention are provided in the dependent claims.

A joint shaft according to the invention, which is designed, in particular, as a universal joint shaft, comprises a first axial connection end and a second connection end which is opposite the first axial connection end. Provided between the two axial connection ends is a central part which connects the first connection end to the second connection end by means of at least one pivot joint. In particular, provided between the central part and the first connection end is a first pivot joint and provided between the central part and the second connection end is a second pivot joint.

The two pivot joints make it possible for the corresponding connection end to be attached in a pivotable manner to the central part and, at the same time, for a torsionally rigid connection to exist between the central part and the connection end. The pivot joint or the pivot joints is/are realized in particular as a universal joint or universal joints.

The central part is provided with length compensation over a longitudinal axis of the joint shaft, this means that the central part is movable apart and together in order to vary the axial length of the central part and consequently the axial distance between the first connection end and the second connection. As has been presented in the introduction, the length compensation, in this case, is advantageously designed in such a manner that it enables torque transmission by means of the joint shaft in any more or less extended state, in particular the maximum transmittable torque or rather the maximum transmittable drive power being at least substantially identical in every state.

In place of or in addition to the central part, an end part of the joint shaft, in particular universal joint shaft, can also be provided with the length compensation according to the invention. The end part is positioned between the central part and one of the two connection ends of the joint shaft or as an extension of the central part, in an advantageous manner between the corresponding pivot joint and the associated connection end. Consequently, the end part can be separated from the central part by the pivot joint and can comprise the connection end on its free axial end. The connection end can be the first connection end of the end part proceeding from the central part. In the case of a multipart end part, in contrast, the connection end can follow one or several upstream connections proceeding from the central part.

According to the invention, the length compensation of the central part and/or of the end part is formed by a tubular first shaft element which comprises at least one internal gearing with inner teeth, which are distributed over the circumference and extend in the direction of the longitudinal axis, and a tubular or rod-shaped second shaft element, which comprises at least one external gearing with outer teeth, which are distributed over the circumference and extend in the direction of the longitudinal axis. The first shaft element is attached to the first connection end, in particular by means of a first pivot joint. The second shaft element is attached to the second connection end, in particular by means of a second pivot joint. When the length compensation is provided in the end part, in a correspondingly advantageous manner, the first shaft element is then directly attached to the first connection end and the second shaft end is indirectly attached to the second connection end, namely at least by means of the interposed central part, in particular by means of a first pivot joint and the central part and according to one embodiment by means of the first pivot joint, the central part and the second pivot joint.

Provided according to the invention then between the first shaft element and the second shaft element is at least one intermediate sleeve, which comprises at least one intermediate sleeve internal gearing with inner teeth, which are distributed over the circumference and extend in the direction of the longitudinal axis, and at least one intermediate sleeve external gearing with outer teeth, which are distributed over the circumference and extend in the direction of the longitudinal axis, and is displaceable in the direction of the longitudinal axis both in relation to the first shaft element and in relation to the second shaft element and, in this case, is attached directly or indirectly to the first shaft element by means of the intermediate sleeve external gearing and to the second shaft element by means of the intermediate sleeve internal gearing.

If precisely one intermediate sleeve is provided, the intermediate sleeve external toothing meshes with the internal gearing of the first shaft element and the intermediate sleeve internal gearing meshes with the external gearing of the second shaft element. If several intermediate sleeves which are stacked radially inside one another are provided, the intermediate sleeve external gearing of the radially outermost intermediate sleeve meshes correspondingly with the internal gearing of the first shaft element and the intermediate sleeve internal gearing of the radially innermost intermediate sleeve meshes with the external gearing of the second shaft element and the intermediate sleeve internal gearing of in each case a first intermediate sleeve which slides radially along on the outside of a second intermediate sleeve, meshes with the intermediate sleeve external gearing of the respective second intermediate sleeve.

According to an advantageous embodiment of the invention, provided in the central part, or when the end part is designed with length compensation, in the end part, are a plurality of axial stops which delimit an extending of the second shaft element axially out of the at least one intermediate sleeve, or rather in the case of several intermediate sleeves out of the radially innermost intermediate sleeve, and an extending of the at least one intermediate sleeve, or rather in the case of several intermediate sleeves the radially outermost intermediate sleeve, axially out of the first shaft element. In a corresponding manner, when several intermediate sleeves are provided, one or several axial stops can be provided which delimit an extending of a respective inner intermediate sleeve out of a respective outer intermediate sleeve.

As a result of the axial stops, the meshing of the gearings is guaranteed to have a sufficient axial length.

Provided in particular is a first axial stop which includes a first contact surface on the first shaft element and a second contact surface on the intermediate sleeve or, where several intermediate sleeves are provided, on the outermost intermediate sleeve, wherein the first and the second contact surfaces are positioned with their end faces opposite one another in the axial direction.

Provided in an advantageous manner is a second axial stop which includes a first contact surface on the intermediate sleeve or, where several intermediate sleeves are provided, on the innermost intermediate sleeve, and a second contact surface on the second shaft element, wherein the first and the second contact surfaces are positioned with their end faces opposite one another in the axial direction.

The first and the second contact surfaces are advantageously in each case in the form of a ring.

According to an embodiment, at least one of the named second contact surfaces, several or all the second contact surfaces is/are formed in each case by an annular disk, which is screwed onto the end face of the second shaft element or of the intermediate sleeve and is positioned on the side of the annular disk facing the end face of the second shaft element or rather the intermediate sleeve.

At least one of the named first contact surfaces, several first contact surfaces or all the first contact surfaces can be formed by a radially inwardly protruding collar on the intermediate sleeve or on the first shaft element, this means in a corresponding manner by a first collar on the intermediate sleeve and a second collar on the shaft element or rather in the case of several intermediate sleeves by corresponding collars, in particular one collar for each intermediate sleeve.

It is particularly favorable when the axial stops are positioned in such a manner that an extending of the second shaft element out of the intermediate sleeve which directly surrounds it, that is to say the radially inner intermediate sleeve which can be however, the only intermediate sleeve, and an extending of the intermediate sleeve which is directly surrounded by the first shaft element, that is to say the radially outer intermediate sleeve, in particular the only intermediate sleeve, out of the first shaft element is delimited to half its axial length or less. The axial length refers, in this case, to the respectively extended component.

It is favorable when provided in the central part and/or in the end part is an entrainment stop which strikes against the end face of the intermediate sleeve when the second shaft element is retracted in order to entrain said intermediate sleeve. As a result, a defined retraction and consequently a defined position of the retracting or rather fully retracted intermediate sleeve is obtained. The entrainment stop provides in particular at the same time a limit stop which prevents the intermediate sleeve being pushed too far onto the second shaft element and jamming.

Provided in the central part and/or in the end part can be a limit stop, against which the intermediate sleeve strikes by way of its end face when retracted into the first shaft element. Said limit stop prevents the intermediate sleeve being pushed too far into the first shaft element.

Provided according to an advantageous embodiment of the invention are radial guide means which, in a radial manner, guide the intermediate sleeve at its extending end and the second shaft element in the region of its inner end in the intermediate sleeve. If several intermediate sleeves are provided, corresponding radial guide means can be provided on the respective inner intermediate sleeve, at the inner end thereof, in order to guide the extending and retracting inner intermediate sleeve in the surrounding intermediate sleeve.

The radial guide means can be realized, for example, on one component or the components which form a second contact surface, or rather which form the second contact surfaces. For example, a component which forms the second contact surface on the second shaft element and/or the second contact surface on the intermediate sleeve, in particular the annular disk, and/or a component which forms the first contact surface on the intermediate sleeve and/or the first contact surface on the first shaft element, in particular the collar, at the same time realizes/realize a radial guide means. Such a radial guide means can serve at the same time for centering the elements, which slide against one another, relative to one another.

In particular, when a connecting hub for sliding on a journal, in particular a flat journal, is provided on an axial connection end of the joint shaft, the first shaft element and the second shaft element can be pre-loaded, in particular pressure pre-loaded, against one another by means of a spring mechanism so that they are able to move apart.

Contact points between the first shaft element, the intermediate sleeve or sleeves and the second shaft element, in particular one or several or all the named contact surfaces and/or stops can be provided with low-wear coatings or can be hardened, in particular edge-hardened, in order to reduce possible wear. In particular, a Rilsan®-coating or a coating by nitriding and/or edge-hardening by case-hardening or inductive-hardening are considered. In addition, plain bearing materials, for example produced from polyamide, PEEK or bronze, can be provided at the corresponding places. Corresponding measures can also be provided at the radial guide means and/or centering means.

BRIEF DESCRIPTION OF THE SEVERAL VIEWS OF THE DRAWING

The invention is to be described as an example below by way of exemplary embodiments and the figures, in which.

DESCRIPTION OF THE INVENTION

Figure 1:
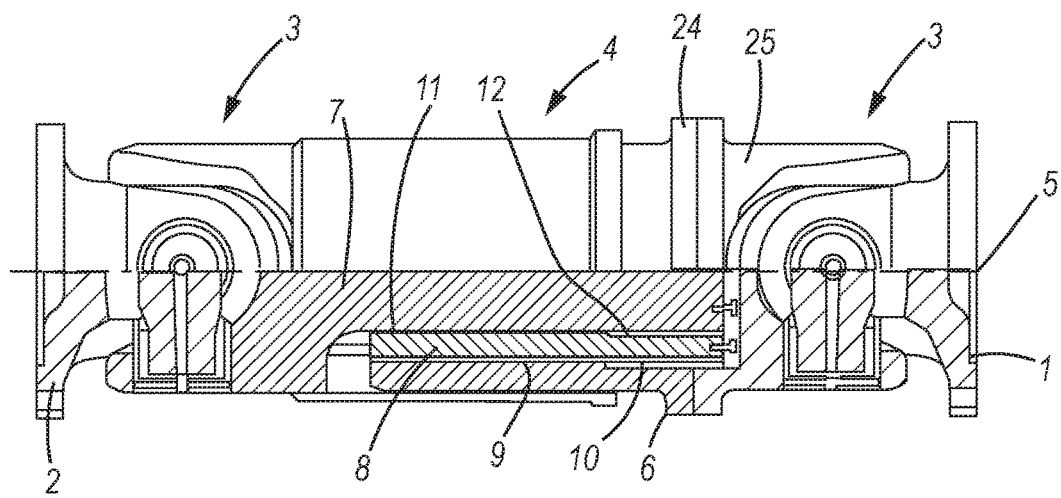
FIG. 1 shows a joint shaft according to a first exemplary embodiment of the invention in the maximum telescoped state.

FIG. 1 shows a joint shaft with a first axial connection end 1 and a second axial connection end 2, both of which are connected in each case by means of a pivot joint 3, here a universal joint, to a central part 4 in a pivotable but torsionally rigid manner. Each pivot joint 3 comprises a journal cross and correspondingly two joint yokes which receive the journal cross. However, the pivot joints 3 could also be designed differently or one pivot joint could be unnecessary.

The central part 4 comprises length compensation over the longitudinal axis 5 of the joint, the longitudinal axis 5 being equated with the rotational axis. To this end, the central part 4 includes a tubular first shaft element 6 and a bar-shaped second shaft element 7. In addition, provided between the first shaft element 6 and the second shaft element 7 is an intermediate sleeve 8, which surrounds the second shaft element 7 over the circumference over part of the axial length thereof and is surrounded over the circumference by part of the axial length of the first shaft element 6. The representations show an axial section of the corresponding shaft elements 6, 7 and the intermediate sleeve below the longitudinal axis 5 in a hatched manner, whereas above the longitudinal axis 5 a top view from the outside of only the shaft element 6 can be seen.

In the exemplary embodiment shown, the central part 4 is attached via an axial flange 24 to the joint yoke 25 of the pivot joint 3 which is connected to the first axial connection end 1. However, this is not compulsory.

The first shaft element 6 comprises an internal gearing 9 with inner teeth which are distributed over the circumference and mesh with the teeth of an intermediate sleeve external gearing 10 in order, on the one hand, to enable axial displacement of the first shaft element 6 in relation to the intermediate sleeve 8 and, on the other hand, to ensure torque transmission between the intermediate sleeve 8 and the first shaft element 6, specifically undiminished in any state which is more or less extended.

The intermediate sleeve 8 comprises an intermediate sleeve internal gearing 11 which comprises inner teeth, which are correspondingly distributed over the circumference and mesh with outer teeth of an external gearing 12 on the second shaft element 7, which teeth are distributed over the circumference. What has been said beforehand concerning the intermediate sleeve external gearing 10 and the internal gearing 9 applies with reference to the interaction between the intermediate sleeve internal gearing 11 and the external gearing 12.

The axial stops will now be described with reference to FIG. 2, which axial stops determine the maximum axial lengths of extension of the intermediate sleeve 8 out of the first shaft element 6 and of the second shaft element 7 out of the intermediate sleeve 8. However, said axial stops have also already been shown in FIG. 1, but for reasons of clarity were not numbered.

A first axial stop comprises a first contact surface 13 on the first shaft element 6 and a second contact surface 14 on the intermediate sleeve 8. This can also be seen clearly again in FIG. 3. When the first contact surface 13 strikes against the end face of the second contact surface 14, the intermediate sleeve 8 cannot be extended any further in the axial direction out of the first shaft element 6.

In the exemplary embodiment shown, the first contact surface 13 is formed by a radially inwardly protruding collar on the first shaft element 6 and the second contact surface 14 is formed by a radially outwardly protruding collar on the intermediate sleeve 8, said collar being provided by an annular disk 15 which is screwed onto the end face of the intermediate sleeve 8. As can be seen in FIGS. 1 and 2, the annular disk 15 forms, on its opposite end face, a stop contact surface 16 which interacts with a further stop contact surface 17 in the first shaft element 6, which together delimit the retraction of the intermediate sleeve 8 into the first shaft element 6.

A first contact surface 13 is correspondingly provided in the intermediate sleeve 8 in the form of a radially inwardly protruding collar which interacts with a second contact surface 14 in the form of a radially outwardly protruding collar on the second shaft element 7. The second contact surface 14 is also formed correspondingly here by an annular disk 15 which is screwed onto the end face of the second shaft element 7 and forms on its rear side a first stop contact surface 16 which interacts with a second stop contact surface in order to delimit the retraction of the second shaft element 7 into the intermediate sleeve 8 and the first shaft element 6. In the case of the exemplary embodiment according to FIG. 2, the second stop contact surface 17 in the first shaft element 6 is also used for striking against the first stop contact surface 16 of the first shaft element 6, whereas according to FIG. 3, the second stop contact surface 17 is formed by the annular disk 15 on the intermediate sleeve 8.

Figure 2:
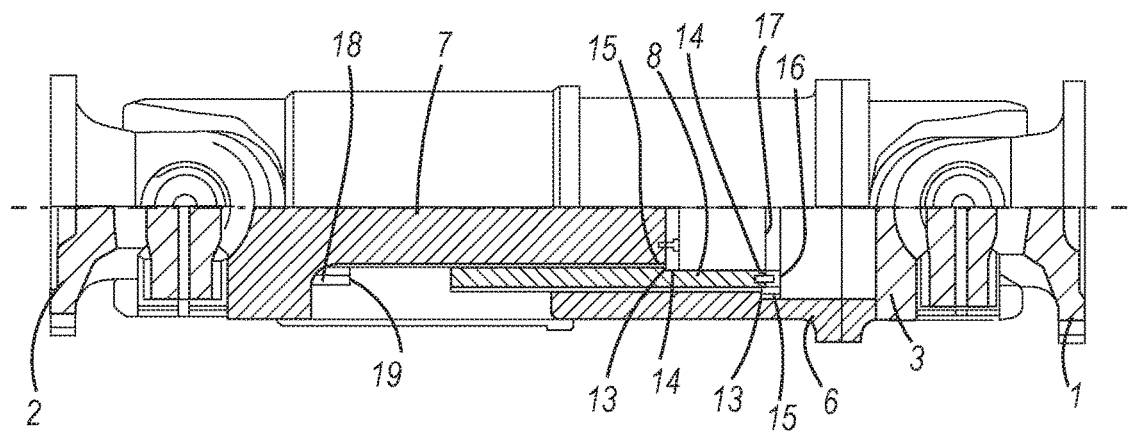
FIG. 2 shows the joint shaft from FIG. 1 in the maximum extended state.

At the same time, in the case of the exemplary embodiment according to FIG. 2, on the outside of the second shaft element a stop 18 is provided in the form of a ring which forms a stop contact surface 19 for the intermediate sleeve 8 so that it is not pushed too far onto the second shaft element 7 or rather the second shaft element 7 is not retracted too far into the intermediate sleeve 8. At the same time, said stop 18 entrains the intermediate sleeve 8 when the second shaft element 7 retracts into the first shaft element 6.

The second shaft element 7 strikes by way of its stop contact surface 16 against the stop contact surface 17 of the first shaft element 6. In the case of the exemplary embodiment according to FIG. 3, said stop 18 on the outside of the second shaft element 7 is not necessary.

In the exemplary embodiment shown, the axial stops or rather the annular disks 15 also serve as radial guide means 20 in order to improve the centering of the gearings and in order to lengthen the supporting length of the gearings.

Figure 3:
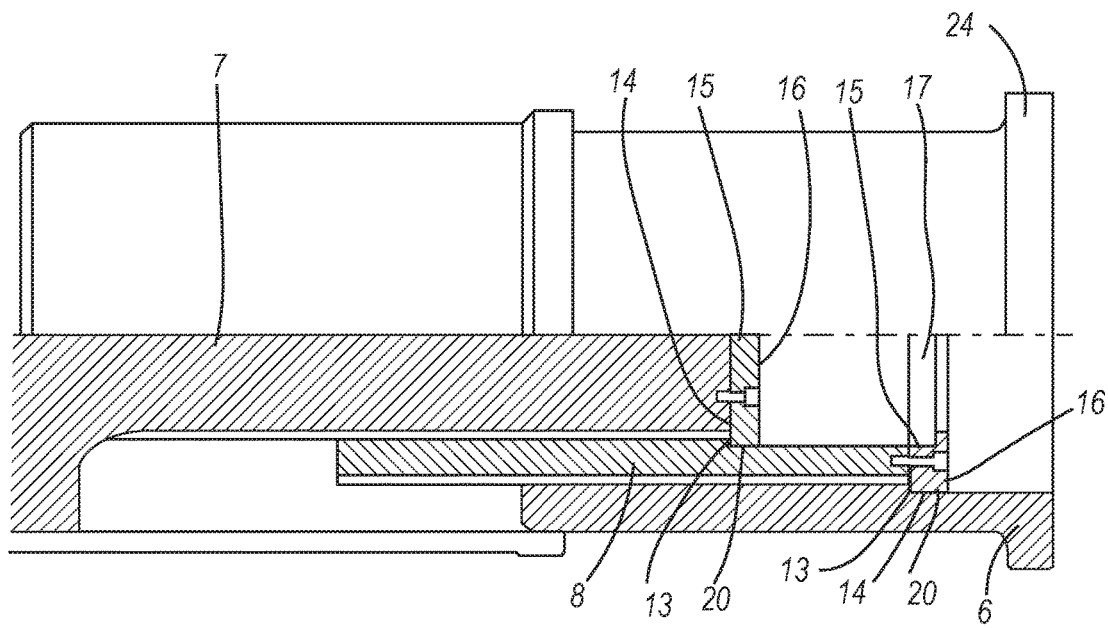
FIG. 3 shows an embodiment according to FIG. 2, but with a modified limit stop of the intermediate sleeve.
Figure 4:
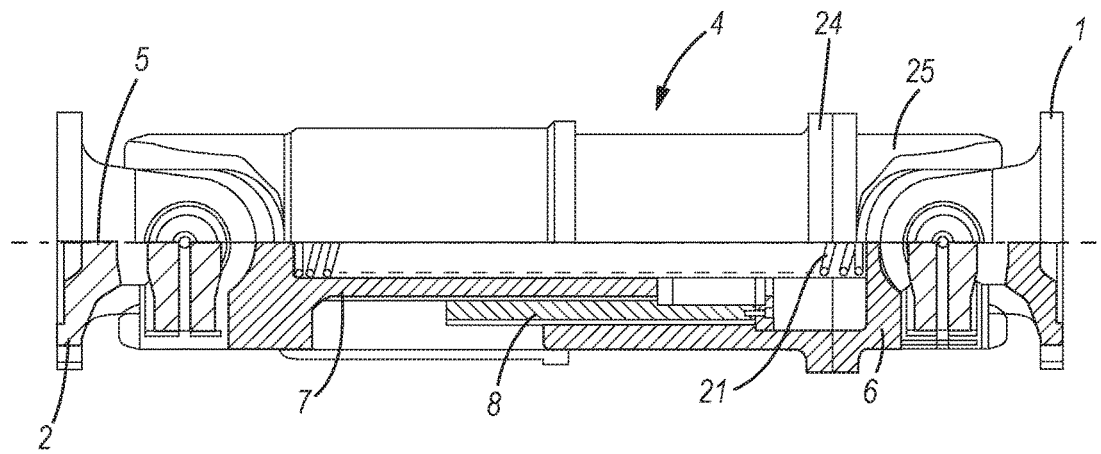
FIG. 4 shows an exemplary embodiment corresponding to FIG. 3 with a spring mechanism.

The exemplary embodiment according to FIG. 4 largely corresponds to that of FIG. 3, but provided here is a compression spring 21 which acts upon the first shaft element 6 and the second shaft element 7 with pressure in the axial direction so that they can be separated. As a result, an axial connection end of the joint shaft can be prevented from slipping from a journal, on which it has been fitted. Naturally, in an embodiment which is not shown here, the axial connection end could also comprise a journal, as a result of which the compression spring 21 then prevents said journal from slipping out of a corresponding associated hub.

Figure 5:
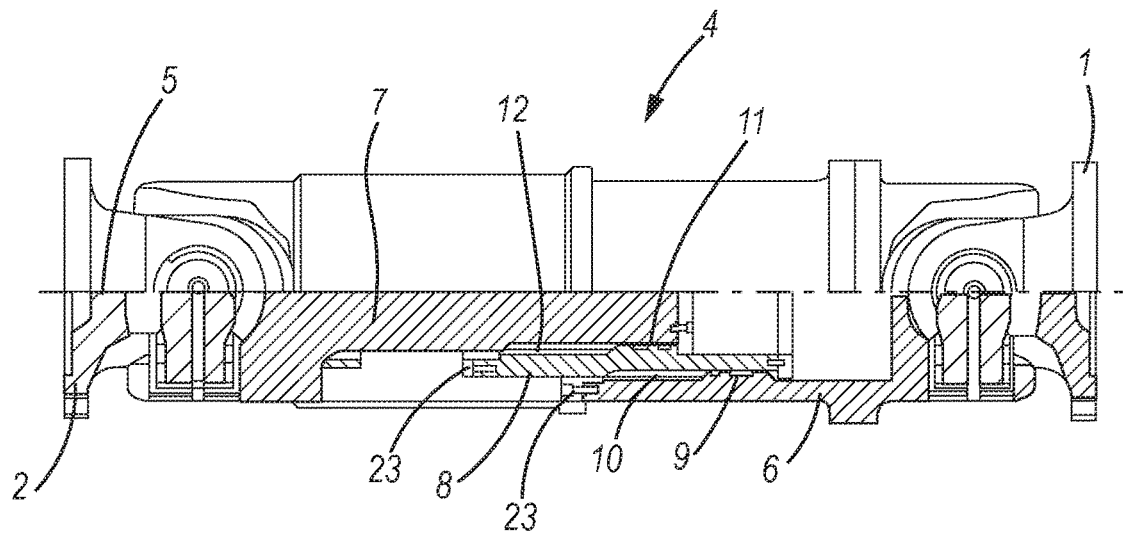
FIG. 5 shows an embodiment similar to FIGS. 1 and 4, but with shortened gearing and additional radial centering means.

In the case of the exemplary embodiment according to FIG. 5, the internal gearing 9 and the intermediate sleeve internal gearing 11 are realized in a comparably shorter manner. The intermediate sleeve internal gearing 11 is consequently at an axial spacing from both axial ends of the intermediate sleeve 8 and the internal gearing 9 is at an axial spacing from the free end of the first shaft element 6, that is to say from the end facing the second shaft element 7. In addition, a centering ring 23 is provided on the free axial end of the first shaft element 6, just as on the corresponding axial end of the intermediate sleeve 8 facing the second shaft element 7.

Such a design according to FIG. 5 with a short gearing set and an additional centering ring 23 is suitable for applications where the comparably short engaged gearing is sufficient for torque transmission and the long profile overlap of the shaft elements 6, 7 and of the intermediate sleeve 8 is only required in order to prevent the joint shaft from buckling. In detail, said buckling is prevented by the plain bearings, which are formed by the centering rings 23, on the axial ends.

Figure 6:
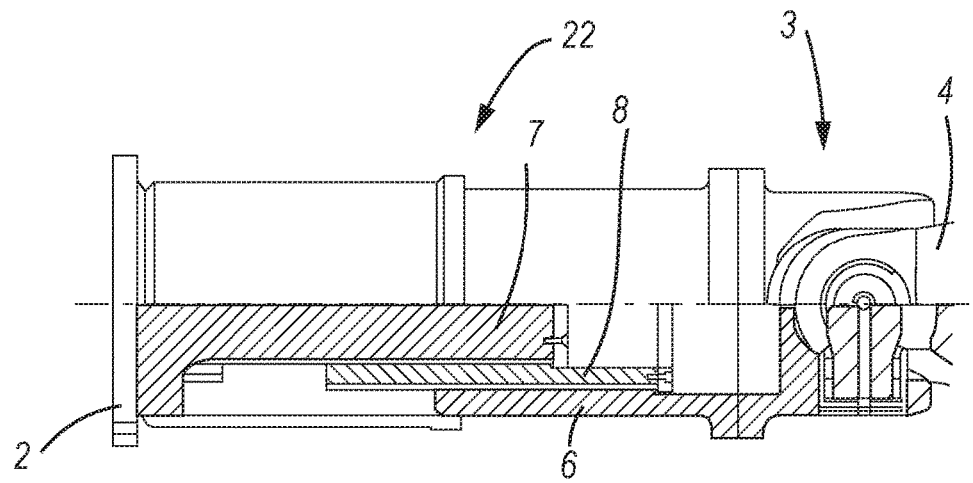
FIG. 6 shows an exemplary embodiment where the length compensation is realized in an end part of the joint shaft.

By way of FIG. 6 it is made clear that the length compensation can also be realized in an end part 22, that is to say between an axial connection end, here the second axial connection end 2, and the central part 4, in particular between the axial connection end, here the second axial connection end 2, and the pivot joint 3 which faces said second axial connection end. Reference is made to the preceding description for further details.

The invention claimed is:

1. A joint shaft, comprising:
a first axial connection end and a second axial connection end;
a central part disposed to connect said first connection end to said second connection end by way of a torsionally rigid and pivotable connection formed with at least one pivot joint, said at least one first joint having a yoke and said central part having a flange connected to said yoke;
said central part having a length compensation over a longitudinal axis of the joint shaft between said central part and one of said first or second connection ends, said length compensation including:
a tubular first shaft element connected to said first connection end and having an internal gearing formed with inner teeth that are distributed over a circumference and extend in a direction of the longitudinal axis; and
a tubular or rod-shaped second shaft element connected to said second connection end and having an external gearing formed with outer teeth that are distributed over the circumference and extend in the direction of the longitudinal axis; and
at least one intermediate sleeve disposed between said first shaft element and said second shaft element, said intermediate sleeve having an intermediate sleeve internal gearing formed with inner teeth that are distributed over the circumference and extend in the direction of the longitudinal axis, and having an intermediate sleeve external gearing formed with outer teeth that are distributed over the circumference and extend in the direction of the longitudinal axis;
said intermediate sleeve being displaceable in the direction of the longitudinal axis relative to said first shaft element and to said second shaft element, being attached with torsional rigidity to said first shaft element by way of said intermediate sleeve external gearing, and being attached with torsional rigidity to said second shaft element by way of said intermediate sleeve internal gearing;
said central part having a plurality of axial stops configured to delimit an extending of said second shaft element axially out of said at least one intermediate sleeve and an extending of said at least one intermediate sleeve axially out of said first shaft element;
said axial stops including a first axial stop formed with a first contact surface on said first shaft element and a second contact surface on said intermediate sleeve, said first and second contact surfaces being formed opposite one another in the direction of the longitudinal axis, and a second axial stop including a first contact surface on said intermediate sleeve and a second contact surface on said second shaft element and positioned opposite said first contact surface of said second axial stop in the direction of the longitudinal axis; and
at least one second contact surface being formed by an annular disk screwed onto an end face of said second shaft element or of said intermediate sleeve, on a side of said annular disk facing the end face.

2. The joint shaft according to claim 1, wherein said first axial connection end, said second axial connection end, and said central part are configured to form a universal joint.

3. The joint shaft according to claim 1, wherein said central part is an end part connected by way of a pivot joint to said first connection end or a central part connected by way of a pivot joint to said first connection end and by way of a pivot joint to said second connection end.

4. The joint shaft according to claim 1, wherein each said first and second contact surfaces is a ring.

5. The joint shaft according to claim 1, wherein said at least one first contact surface or each of a plurality of said first contact surfaces is a radially inwardly protruding collar on said intermediate sleeve or on said first shaft element.

6. The joint shaft according to claim 1, wherein said axial stops are positioned such that an extending of said second shaft element out of said intermediate sleeve, which directly surrounds said second shaft element, and an extending of said intermediate sleeve, which is directly surrounded by said first shaft element out of said first shaft element is delimited to a maximum of half an axial length thereof.

7. The joint shaft according to claim 1, which comprises a stop in said central part disposed to strike against an end face of said intermediate sleeve when said second shaft element is retracted, in order to entrain said intermediate sleeve.

8. The joint shaft according to claim 1, which comprises a limit stop in said central part disposed to strike against an end face of said intermediate sleeve upon insertion into said first shaft element.

9. The joint shaft according to claim 1, wherein a component which forms said second contact surface on said second shaft element and/or said second contact surface on said intermediate sleeve are configured to also function as a radial guide and/or a centering device.

10. The joint shaft according to claim 9, wherein an annular disk or a collar formed on said intermediate sleeve and/or on said first contact surface on said first shaft element are configured to also function as a radial guide and/or a centering device.

11. The joint shaft according to claim 1, which comprises a spring mechanism disposed to pre-load said first and second shaft elements in a direction apart from one another.

12. The joint shaft according to claim 1, wherein said internal gearing is positioned at an axial spacing from an axially free end of said first shaft element, said intermediate sleeve internal gearing is positioned at an axial spacing from one or both free ends of said intermediate sleeve, said intermediate sleeve external gearing is positioned at an axial spacing from one or both free ends of said intermediate sleeve, and said external gearing is positioned at an axial spacing from an axially free end of said second shaft element, and wherein a centering ring is provided on the corresponding said free end.

13. The joint shaft according to claim 1, wherein said length compensation is provided in said end part between said first axial connection end or said second axial connection end and a respective said pivot joint attaching said end part to said central part.

14. The joint shaft according to claim 1, wherein said at least one intermediate sleeve is one of a plurality of intermediate sleeves including an outermost intermediate sleeve formed with said first and second contact surfaces with respective end faces opposite one another in the direction of the longitudinal axis, and a second axial stop including a first contact surface on said intermediate sleeve, with respective end faces positioned opposite one another in the direction of the longitudinal axis.

15. The joint shaft according to claim 1, wherein said first shaft element, said at least one intermediate sleeve, and said second shaft element are formed with contact surfaces, and said contact surfaces being coated with low-wear coatings or being hardened in order to reduce wear.

16. The joint shaft according to claim 15, wherein said contact surfaces are formed with a Rilsan®-coating or a coating by nitriding.

17. The joint shaft according to claim 15, wherein said contact surfaces are dege-hardened by case-hardening or inductive hardening.

18. The joint shaft according to claim 1, wherein said first shaft element, said at least one intermediate sleeve, and said second shaft element are at least partly formed of a material selected from the group consisting of polyamide, polyetheretherketone (PEEK), and bronze.

* * * * *